(12) United States Patent
Snelson

(10) Patent No.: US 7,111,903 B1
(45) Date of Patent: Sep. 26, 2006

(54) SUPPLEMENTAL MOTORCYCLE SEAT

(76) Inventor: Bill Snelson, 224 Hubbell Ave., Mankato, MN (US) 56001

( * ) Notice: Subject to any disclaimer, the term of this patent is extended or adjusted under 35 U.S.C. 154(b) by 0 days.

(21) Appl. No.: 10/640,983

(22) Filed: Aug. 14, 2003

(51) Int. Cl.
*B62J 1/00* (2006.01)

(52) U.S. Cl. .......................... 297/256.16; 297/195.13; 280/288.4

(58) Field of Classification Search .............. 297/250.1, 297/195.13, 195.12, 195.1, 256.16, 201, 297/284.9, 284.1, 284.3; 280/288.4, 304.3, 280/304.4; 5/653, 654
See application file for complete search history.

(56) References Cited

U.S. PATENT DOCUMENTS

| | | | |
|---|---|---|---|
| 2,330,341 A | 9/1943 | Du Pont et al. | |
| 3,625,405 A | 12/1971 | Kezar et al. | |
| 3,712,670 A | 1/1973 | Svehla et al. | |
| 4,466,660 A | 8/1984 | Mabie | |
| 4,549,629 A | 10/1985 | Komuro | |
| 4,804,221 A | 2/1989 | Saiki | |
| 5,553,915 A | 9/1996 | Stamatakis | |
| 5,697,671 A * | 12/1997 | Shavitz | 297/250.1 |
| 6,481,792 B1 * | 11/2002 | Goin | 297/195.13 |
| 6,491,124 B1 | 12/2002 | Thompson et al. | |
| 6,508,511 B1 * | 1/2003 | Kolpin | 297/256.16 |
| 6,648,408 B1 * | 11/2003 | Grove | 297/195.13 |
| 2002/0067059 A1 * | 6/2002 | Kaptur | 297/195.1 |
| 2002/0069464 A1 * | 6/2002 | Welsh | 5/653 |

* cited by examiner

*Primary Examiner*—Milton Nelson, Jr.
(74) *Attorney, Agent, or Firm*—Moss & Barnett, P.A.

(57) ABSTRACT

The present invention is a supplemental motorcycle seat for the rear passenger that provides additional lateral seat support. The supplemental seat includes a pair of side cushions and a pair of support frames. The support frames define a support for the seat cushions and are designed to be mounted to the motorcycle by accessory supports customarily provided with stock motorcycles. The support frames are mounted such that a seat cushion is positioned adjacent to each side of the seat provided with the motorcycle and extend laterally outward from each side of the motorcycle seat. The frames are also mountable to the frame of a touring pack (frame for a rear trunk) that is capable of being mounted to the motorcycle accessory supports, allowing the support seats to be individually mountable or mountable in combination with the tour pack.

5 Claims, 5 Drawing Sheets

SUPPLEMENTAL MOTORCYCLE SEAT

FIELD OF INVENTION

The present invention relates to a supplemental seat for motorcycles.

RELATED ART

Motorcycle seats tend to be narrow to provide both an aesthetically sleek look as well as some maneuverability for the rider. However, on trips of long duration, narrow motorcycle seats may not provide the support required for the rider. Some accommodation has been made in the marketplace to provide additional support by widening the seats for drivers and to provide supplemental seats for rear passengers. Of some importance is ease of installation and removal of these supplemental seats for rear passengers. Supplemental seats are desirable for long trips, but may be inconvenient on trips of short duration.

Some of these supplemental seats, such as U.S. Pat. No. 6,481,792 B1 to Goin, require replacement of the motorcycle seat with a specially designed seat that will accommodate interlocking side pads. Another supplemental seat illustrated in U.S. Pat. No. 5,697,671 to Shavitz, provides a seat overlay that must be custom built to form a secure bond with the particular motorcycle seat it covers and expands.

There is a need for a supplemental motorcycle seat for rear seat passengers that does not require significant modification or replacement of the stock motorcycle seat and which can be quickly attached and detached.

BRIEF SUMMARY OF THE INVENTION

In a first preferred embodiment, the supplemental motorcycle seat of the present invention includes a pair of seat cushions and a pair of support frames. The support frames each define a platform to support supplemental seat cushions and flanges for attachment of the support frames to accessory supports provided on the frame of the motorcycle. The seat cushions are mounted on the platform of the support frames and the support frames are mounted, one on each side of the motorcycle seat, so that the seat cushions are positioned adjacent and extend laterally from the seat provided with the motorcycle. In the alternative, the flanges can be directly attached to the frame of common tour packs mounted to the motorcycle accessory supports. (A tour pack typically includes a framework for supporting a rear trunk; the framework is secured to accessory supports provided on the motorcycle. With many motorcycles, such as those produced by Harley-Davidson®, these accessory supports include quick release mechanisms allowing easy installation and removal of accessories. There are typically at least two accessory supports on each side of the motorcycle.)

When used with a tour pack, the support frames are fixed to the frame of the tour pack such that the seat cushions extend laterally outward from each side of the seat provided with the motorcycle. Removal of the tour pack is quick and easy, and the supplemental seats are simply removed with the tour pack.

When extra seat support is desired, the supplemental seats of the present invention are quickly and easily installed directly to the motorcycle using existing accessory supports provided with the motorcycle, without modification to original equipment; when the supplemental seats of the present invention is secured to common tour packs, only minimal modification (drilling two holes) is initial required; after that, the supplemental seats are readily installed or removed with the tour pack.

DETAILED DESCRIPTION OF THE INVENTION

The present invention of a lateral or supplemental motorcycle seat will be described as it applies to its preferred embodiments. It is not intended that the present invention be limited to the described embodiments. It is intended that the invention cover all modifications, equivalents and alternatives which may be included within the spirit and scope of the invention.

Figure 1:
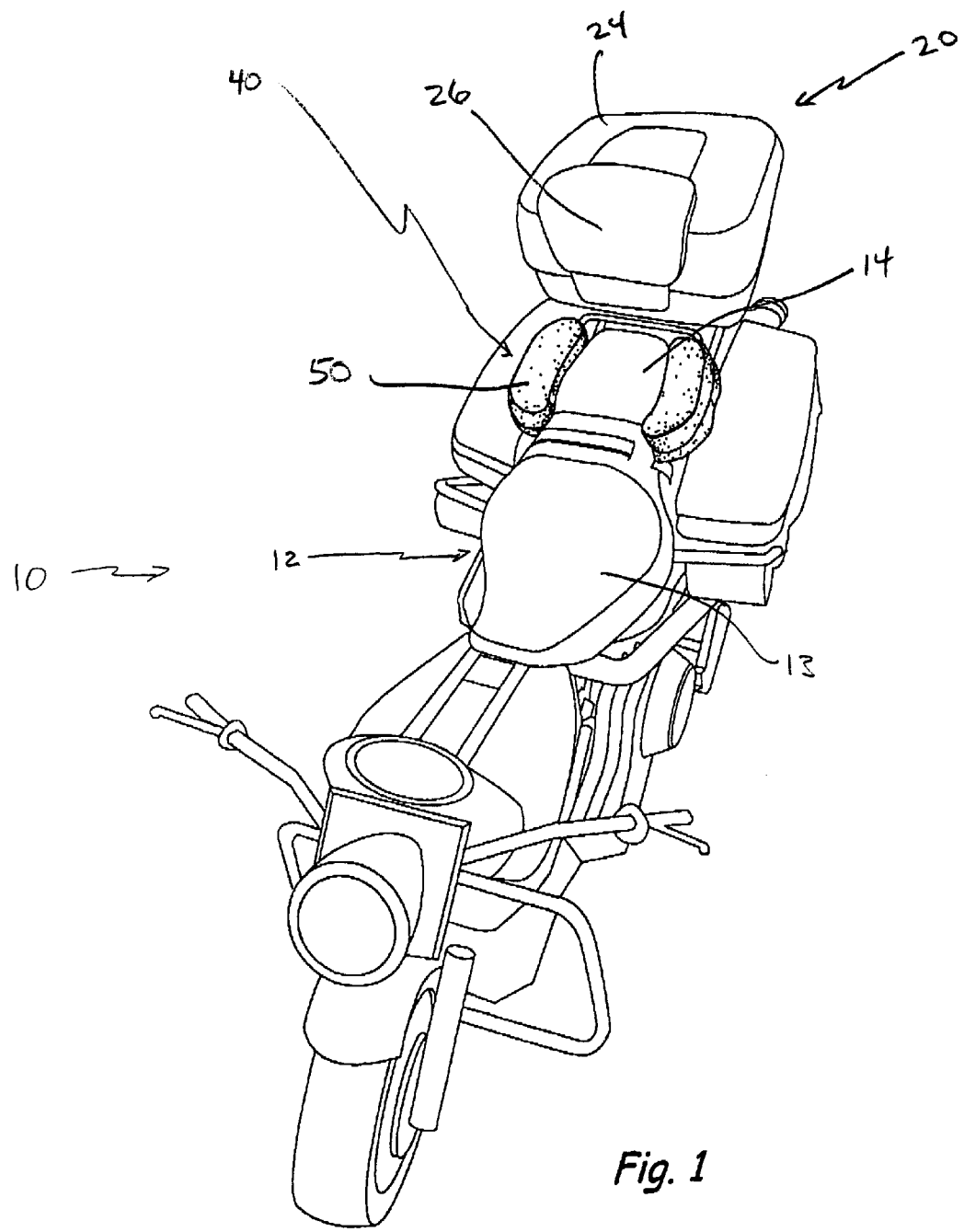
FIG. 1 is an isometric view of a motorcycle with the supplemental seats of the present invention installed thereon.

Referring now to the drawings, wherein like reference numerals indicate corresponding structure throughout the several views, and referring in particular to FIG. 1, there is shown a preferred embodiment of the lateral seat assembly 40 according to the present invention, mounted on a motorcycle 10 of common configuration. The present invention is particularly designed to be compatible with Harley-Davidson® motorcycles equipped with standard "quick release" accessory supports (to accommodate at least a tour pack). A typical motorcycle seat 12 is configured to define a driver's (or front passenger's) seat 13 and a rear passenger seat 14. A tour pack 20 is mounted on the motorcycle 10 to support rear trunk 24. Rear trunk 24 is also shown equipped with a back rest 26. The lateral seat assembly 40 of the present invention is mounted either to the tour pack frame (which in turn is mounted to the accessory supports of the motorcycle frame) or directly to the accessory supports of the motorcycle frame such that each seat cushion 50 is substantially level with and extends laterally from the passenger seat provided with the motorcycle.

Figure 5:
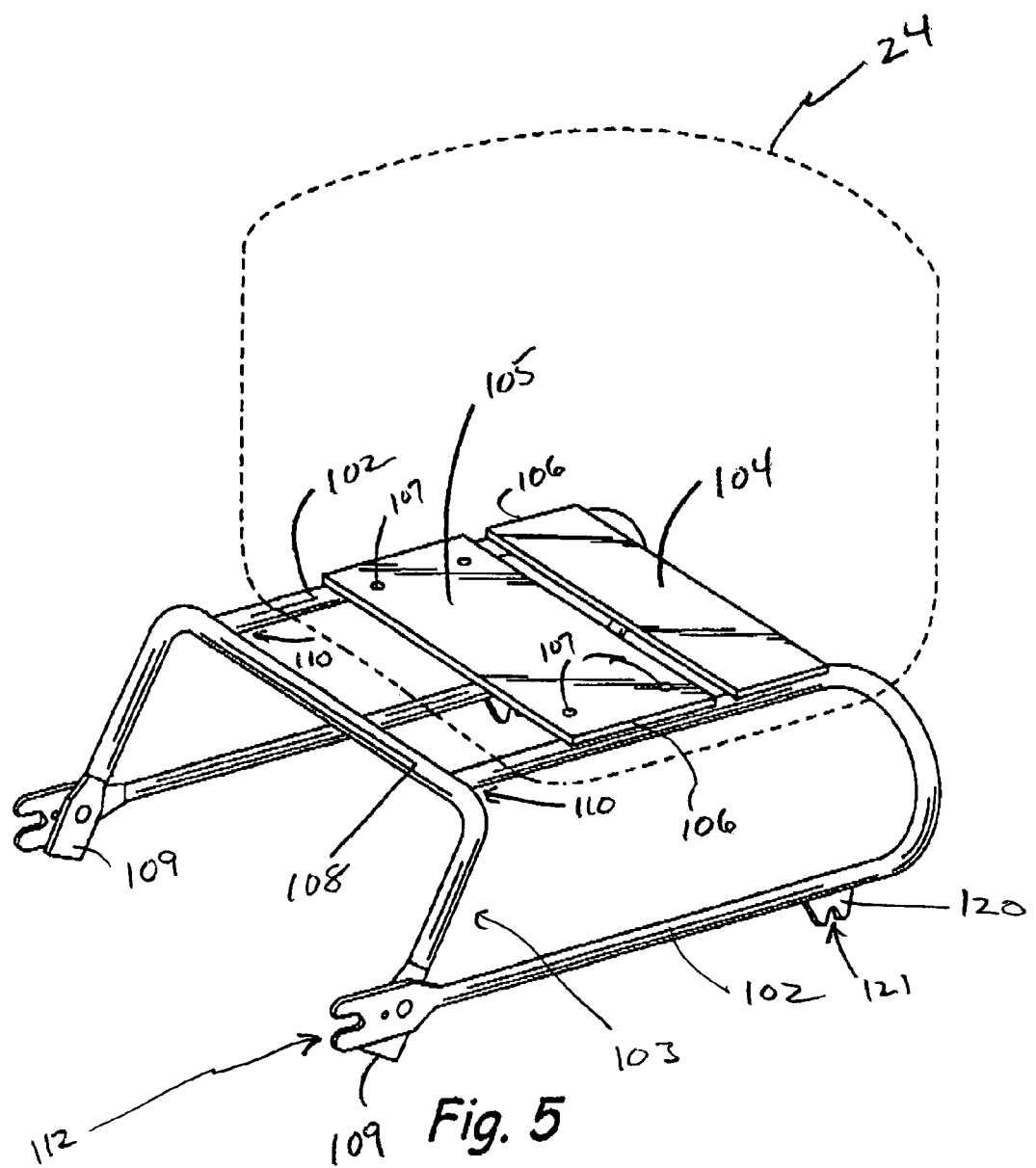
FIG. 5 is an isometric view of a frame of a common tour pack.

As illustrated in FIG. 5, a common tour pack frame 100 includes two tubular side supports 102 having a generally U-shaped configuration. The side supports 102 are secured in generally parallel alignment with each other (perhaps slightly inclined inwards towards each other at the top) by a rear base plate 104 and a front base plate 105. The base plates 104 and 105 are oriented transversely with respect to the tubular side supports 102 and are welded near their ends 106 to the tubular side supports 102 at the top side of the side supports 102. The tubular side supports 102 are further secured together at the front end 103 of the tubular side supports 102 by a generally up-side-down U-shaped mounting bar 108. A first end 110 of each of the tubular side supports 102 are secured to the top of mounting bar 108 at or near the lateral edge of the mounting bar 108. A second end 112 of tubular side supports 102 is secured to a free end 109 of mounting bar 108 either by weld, pins or other means.

Figure 2:
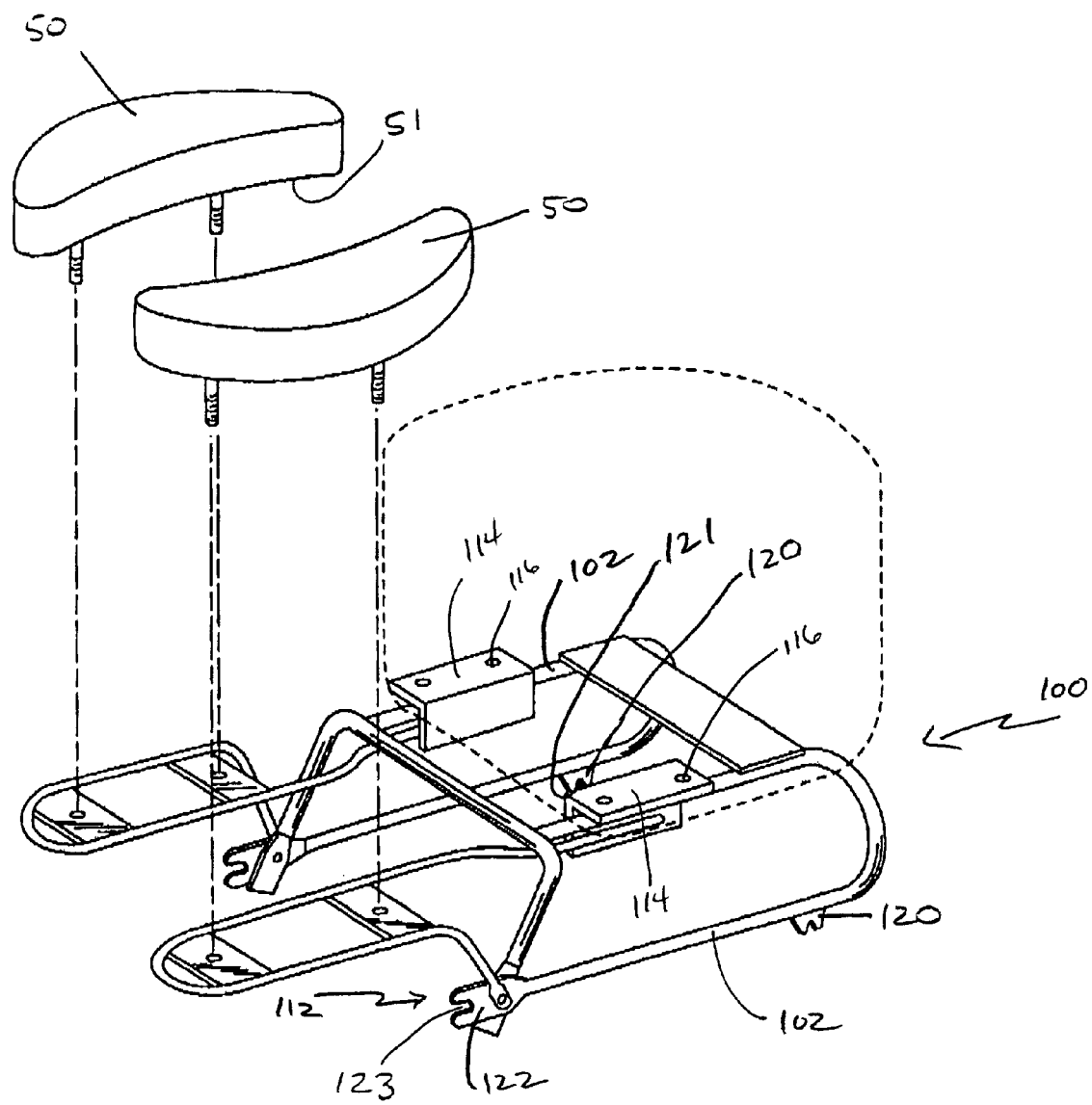
FIG. 2 is an exploded view of a motorcycle tour pack frame to which is secured a first preferred embodiment of the supplemental seat of the present invention.

The front base plate 105 further includes openings 107 that correspond to openings 116 on L-shaped brackets 114 of the present invention (FIG. 2). When the side cushion assembly 40 of the present invention is mounted on the tour pack frame 100, the L-shaped brackets 114 of the present invention are secured to and beneath the front base plate 105 by standard bolts extended through openings 107 and 116.

Strategically positioned and extending downward from a bottom leg of the tubular side supports 102 of tour pack frame 100 is a first flange 120 defining a slot 121. A second flange 122 is defined at the forward extending second end 112 of tubular side support 102 and defines a second slot 123. Flanges 120 and 122 are designed to engage quick release mechanisms mounted on the motorcycle accessory supports (not shown) that are well known in the prior art, for quick and easy mounting of the tour pack to the frame of motorcycle 10. The tubular side supports 102, base plates 104 and 105 and mounting bar 108 form a generally rectangular, light weight support for the rear trunk 24 and also provide a framework to which the lateral seat assembly 40 can be secured.

Figure 4:
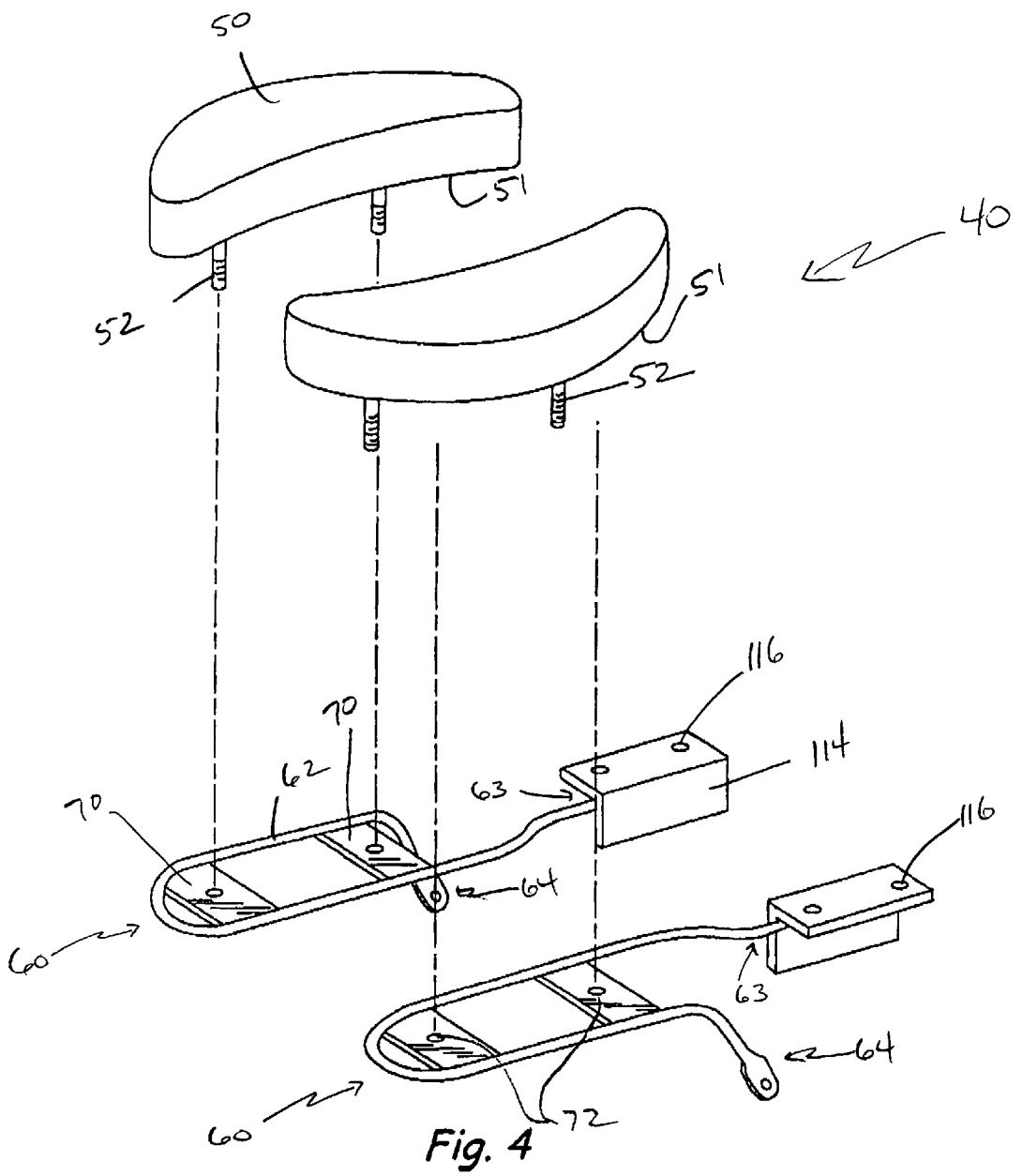
FIG. 4 is an exploded view of a first preferred present invention, including support brackets and seat cushions.

Referring to FIG. 4, in a first preferred embodiment of the present invention, the lateral seat assembly 40 includes seat cushions 50 of generally banana shape (inward curvature facing the main motorcycle seat to mate with the outward curvature of the main motorcycle seat). Although the seat cushions are illustrated with having generally opposed banana shapes to coincide with the support needed for a seated passenger on the motorcycle 10, it is anticipated that other configurations are possible. Mounting bolts 52 extend downward from a base 51 of the seat cushions 50. The seat cushions 50 are designed to be mounted onto cushion supports 60.

Cushion supports 60 include tubular supports 62 formed in a generally U-shape. (Tubular supports are commonplace and provide strength with minimal weight.) When cushion support 60 is mounted to the tour pack frame 100, first free end 63 of tubular support 62 is attached to the L bracket 114 which in turn is attached to front base plate 105 of the tour pack frame 100, and second free end 64 of the tubular support 62 is secured, typically bolted, to the flange 122 of tour pack frame 100. A common tour pack does not include an opening in flange 122 to receive a bolt to secure second free end 64 of the tubular support 62 to flange 122; thus, minor modification, drilling a mating hole in each side flange 122, is required. A pair of spaced support plates 70 with openings 72 are secured, typically by weld, between and to each leg of the U-shaped tubular supports 62 as shown in FIG. 4, to form two separated, planar supports for the seat cushions 50. The openings 72 in support plates 70 are spaced to mate with bolts 52 so that seat cushions 50 can be secured to the support plates 70.

The first preferred embodiment of the present invention 40 is secured to the tour pack frame and extends laterally on each side of the rear passenger seat. Because the tour pack frame 100 is secured to the quick release accessory supports on the frame of the motorcycle, the supplemental seats of the present invention are quickly removed or attached with the tour pack assembly 20.

Figure 3:
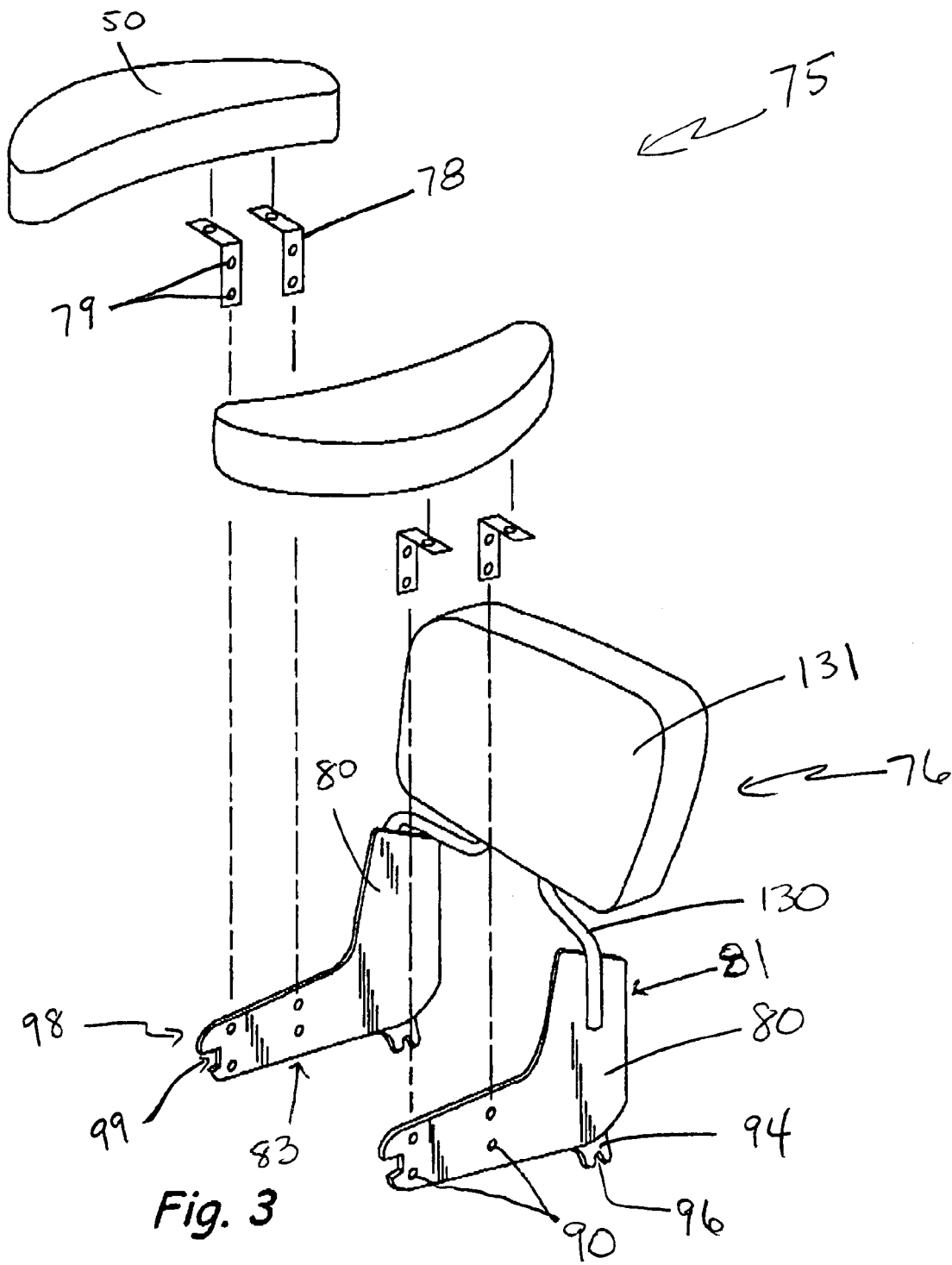
FIG. 3 is an alternate embodiment of the supplemental seat of the present invention in combination with a motorcycle back rest.

In a second preferred embodiment of the lateral seat assembly illustrated at 75 in FIG. 3, the second embodiment of lateral seat assembly 75 is designed to be mounted in combination with a back rest assembly 76. The second embodiment of a lateral seat assembly 75 includes a pair of L-shaped side mounting plates 80. A vertical leg 81 of each side mount plate 80 supports the back rest assembly 76 and includes mounting brackets (not shown) for receiving tubular supports 130 that support backrest cushion 131. The horizontal leg 83 of side mounting plate 80 includes strategically placed openings 90 that correspond to openings 79 in L-shaped support brackets 78. The L-shaped support brackets 78 are used to secure the seat cushions 50 to the side mounting plates 80 with standard bolts and nuts. However, other means for securing the seat cushions 50 to the side mounting plates 80 which are presently known in the art are anticipated by the present invention.

The horizontal leg 83 of side of each mounting plate 80 further includes a downward extending flange 94 extending downward from the rear, bottom edge of the horizontal leg 83. Flange 94 includes a slot 96 for engaging an accessory support (not shown) provided on the frame of motorcycle 10. At the front end of the horizontal leg 83 is another U-shaped, forward facing flange 98 deferring a second slot 99 also designed to engage an accessory support (not shown) provided on the frame of motorcycle 10. Flanges 98 and 94 are designed to releasably engage the accessory supports to secure the side mounting plates 80 in place. One of the plates 80 is positioned on each side of the main motorcycle seat. The seat cushions 50 are mounted on the side mounting plates 80 such that they are located adjacent to and extend laterally outward from the seat provided with the motorcycle, in opposite directions from each other.

Both embodiments of the present invention are easy to use, may be quickly installed and removed from a motorcycle equipped with accessory supports. The present invention requires no modification of most Harley-Davidson® motorcycles to mount directly to the frame accessory supports and minimal modification (drilling one hole in each flange 122) to be mounted to a Harley-Davidson® compatible tour pack frame as shown at 100. Although particularly compatible with Harley-Davidson® motorcycles, the present invention is believed to be compatible with all motorcycles and tour packs of design similar to that disclosed herein.

The invention claimed is:

1. A supplemental seat for a motorcycle equipped with a passenger seat and releasable supports for motorcycle accessories, including:
   a. a motorcycle passenger seat;
   b. a pair of side seat cushions being adapted to be disposed on opposite sides of the motorcycle passenger seat;
   c. at least one seat cushion support frame for each side seat cushion, each seat cushion support frame including a side seat support for supporting the side seat cushion and mounting means for mounting the seat cushion support frame to one or more releasable attachment supports such that the side seat support frame is mounted substantially adjacent to the passenger seat and extends laterally from the motorcycle; and
   d. fastening means for securing side seat cushions to the side seat supports.

2. A seat assembly for use with a motorcycle having a passenger seat and releasable attachment supports for mounting accessories, comprising:
   a. a motorcycle passenger seat;
   b. a pair of seat cushions, each of the seat cushions being adapted to being disposed proximate to and unattached from the passenger seat;
   c. a seat cushion support frame for each seat cushion, each seat cushion support frame including a seat cushion support for supporting a corresponding seat cushion and mounting means for mounting each cushion support frame to at least one releasable attachment support of the motorcycle such that the seat cushions are positioned adjacent opposite sides of the passenger seat and extend laterally from the motorcycle in opposite directions.

3. The seat assembly of claim 2 wherein the seat cushion support frames are a pair of support plates, each having a generally L-shaped configuration defining a vertical leg and horizontal leg, with mounting flanges depending from the horizontal leg for mounting the support plate to the accessory supports of the motorcycle such that one support plate is located on each side of the passenger seat.

4. The seat assembly of claim 2 wherein each seat cushion support frame comprises a tube support having a first and second end, including a generally U-shaped portion defining substantially parallel first and second legs with, a support plate secured between the first and second legs of the U-shaped portion of the tubular support to define a platform for supporting a motorcycle seat cushion, the first and second end of each tubular support designed to engage an accessory support such that the tubular supports are mounted on opposite sides of an existing motorcycle passenger seat with the platform portion of the tubular support extending laterally from the motorcycle passenger seat.

5. The seat assembly of claim 2 wherein the mounting means consists of flanges having slots of predetermined configuration for engagement with the motorcycle accessory supports.

* * * * *